(12) United States Patent
Minami et al.

(10) Patent No.: US 6,962,379 B2
(45) Date of Patent: Nov. 8, 2005

(54) BUMPER SHOCK ABSORBING STRUCTURE

(75) Inventors: Hideki Minami, Wako (JP); Akihiro Shibuya, Wako (JP); Masashi Ohkubo, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 10/738,925

(22) Filed: Dec. 16, 2003

(65) Prior Publication Data

US 2004/0178645 A1    Sep. 16, 2004

(30) Foreign Application Priority Data

Dec. 27, 2002    (JP) .................... P.2002-379992

(51) Int. Cl.[7] ................................................ B60R 19/18
(52) U.S. Cl. ................................ 293/120; 293/155
(58) Field of Search .......................... 293/120, 121, 293/155, 122

(56) References Cited

U.S. PATENT DOCUMENTS

| | | | |
|---|---|---|---|
| 4,830,416 A | * | 5/1989 | Matsuoka .................... 293/120 |
| 5,154,462 A | * | 10/1992 | Carpenter ................... 293/120 |
| 5,498,044 A | * | 3/1996 | Bovellan et al. ............ 293/120 |
| 6,209,934 B1 | * | 4/2001 | Sakuma et al. ............. 293/120 |
| 6,609,740 B2 | * | 8/2003 | Evans ......................... 293/121 |
| 6,669,251 B2 | * | 12/2003 | Trappe ....................... 293/120 |

FOREIGN PATENT DOCUMENTS

JP    5-80918    11/1993

* cited by examiner

Primary Examiner—Patricia L. Engle
(74) Attorney, Agent, or Firm—Hamre, Schumann, Mueller & Larson, P.C.

(57) ABSTRACT

A shock absorbing member attaching structure for attaching a shock absorbing member 12 made from a resin to a bumper beam 11 of a vehicle body, characterized in that protruding portions 22, 23 which protrude in opposite directions are provided on the bumper beam 11, and in that attaching portions 31, 32 are provided on the shock absorbing member 12 which are adapted to ride over the respective protruding portions 22, 23 by virtue of elastic deformation thereof to be locked onto the protruding portions 22, 23 on a longitudinally inward side thereof.

5 Claims, 10 Drawing Sheets

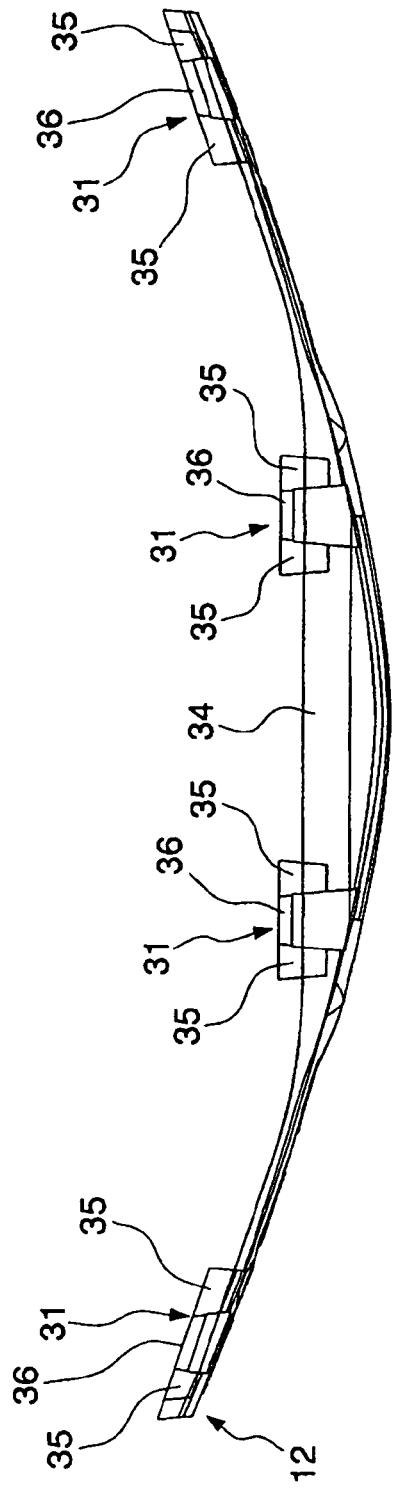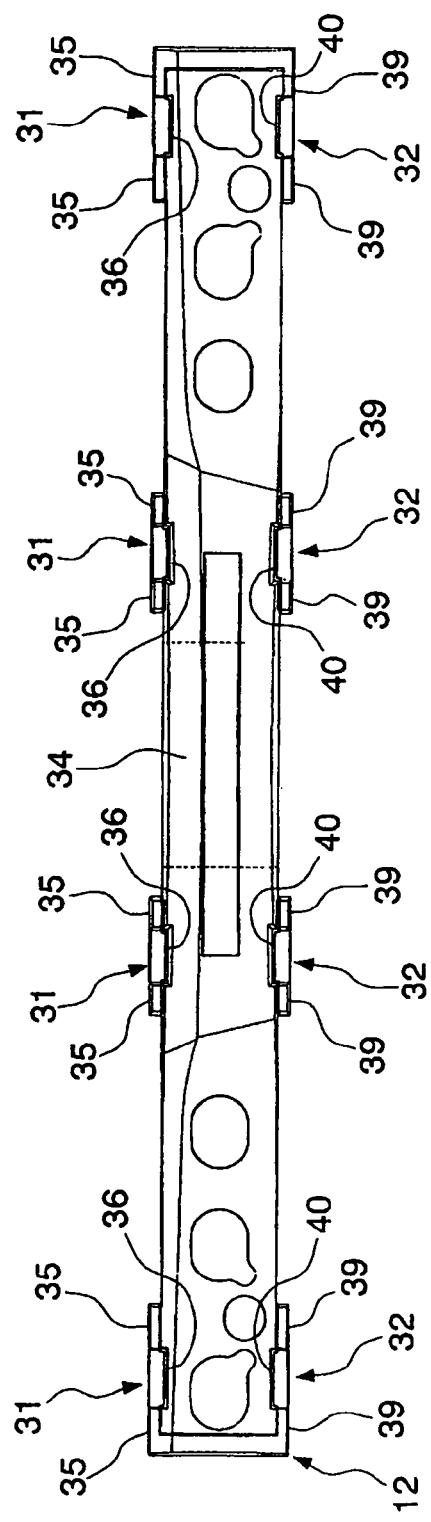
FIG. 5A
FIG. 5B

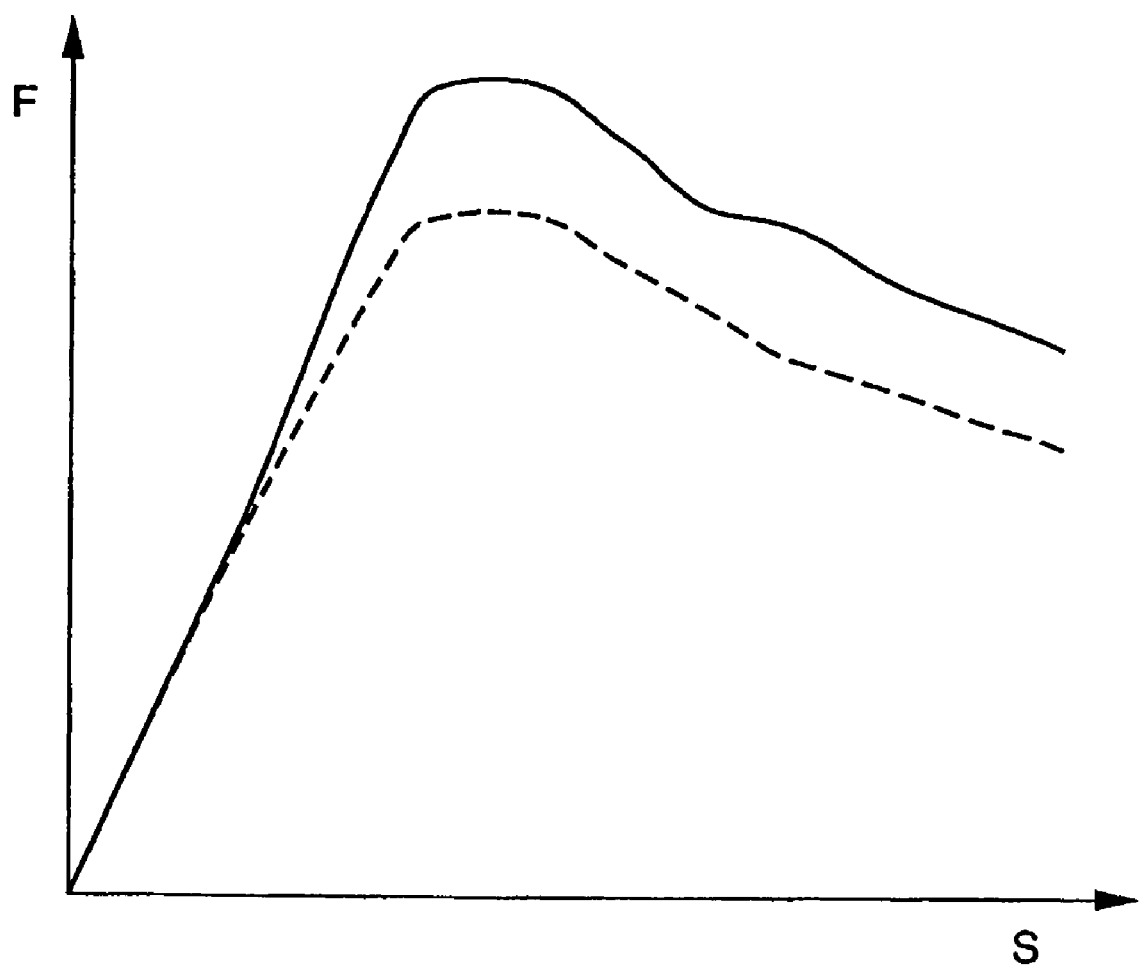

BUMPER SHOCK ABSORBING STRUCTURE

BACKGROUND OF THE INVENTION

The present invention relates to a bumper shock absorbing structure for attaching a resin-made shock absorbing member to a bumper beam of a vehicle body.

As to shock absorbing member attaching structures for attaching a resin-made shock absorbing structure to a bumper beam of a vehicle body, there exists a shock absorbing member attaching structure for attaching a shock absorbing member to a bumper beam with clips (for example, refer to JP-UM-A-5-80918).

As is described above, with the structure for attaching the shock absorbing member to the bumper beam with clips, attaching clips are required, and this leads to a problem that the numbers of components and attaching man-hours are increased.

SUMMARY OF THE INVENTION

Thus, an object of the invention is to provide a shock absorbing member attaching structure which can decrease the numbers of components and attaching man-hours.

With a view to attaining the object, according to a first aspect of the invention, a shock absorbing member attaching structure for attaching a shock absorbing member (for example, shock absorbing members 12, 52 in an embodiment of the invention) made from a resin to a bumper beam (for example, bumper beams 11, 51 in the embodiment) of a vehicle body, characterized in that protruding portions (for example, protruding portions 22, 23, 79, 80 in the embodiment) which protrude in opposite directions are provided on the bumper beam, and in that attaching portions (for example, attaching portions 31, 32, 90, 91) are provided on the shock absorbing member which are adapted to ride over the respective protruding portions by virtue of elastic deformation thereof to be locked onto the protruding portions on a longitudinally inward side thereof.

According to the construction, the shock absorbing member is attached to the bumper beam when the respective attaching portions thereof ride over the mating protruding portions on the bumper beam by virtue of elastic deformation thereof to be locked onto the protruding portions on the longitudinally inward side thereof.

According to a second aspect of the invention, there is provided a shock absorbing member attaching structure as set forth in the first aspect of the invention, wherein a sloping chamfered portion or curved chamfered portion (37, 41, 94, 97) is formed on each attaching portion so as to extend from a longitudinally inward side to a side which is closer to the opposing attaching portion.

According to the construction, when the shock absorbing member is pressed against the bumper beam, the respective attaching portions are brought into abutment with the respective protruding portions on the bumper beam at the sloping chamfered portions or curved chamfered portions formed on the respective attaching portions in such a manner as to extend from the longitudinally inward side to the side which is closer to the opposing attaching portion, and are then guided to follow the configuration of the sloping chamfered portions or curved chamfered portions so as to elastically deform with ease to thereby ride on the respective protruding portions.

According to a third aspect of the invention, there is provided a shock absorbing member attaching structure as set forth in the first or second aspect of the invention, wherein a sloping chamfered portion or curved chamfered portion (for example, a curved chamfered portion 26, 29, 83, 86) is formed on each protruding portion so as to extend from a longitudinally outward side to a side which is separated farther apart from the opposing protruding portion.

According to the construction, when the shock absorbing member is pressed against the bumper beam, the respective attaching portions are brought into abutment with the sloping chamfered portions or curved chamfered portions formed on the respective protruding portions on the bumper beam in such a manner as to extend from the longitudinally outward side to the side which is separated farther apart from the opposing attaching portion, and are then guided to follow the configuration of the sloping chamfered portions or curved chamfered portions so as to elastically deform with ease to thereby ride on the respective protruding portions. Moreover, since the sloping chamfered portions or curved chamfered portions are formed in such a manner as to extend from the longitudinally outward side to the side which is separated farther apart from the opposing attaching portion, that is, on the side which faces the shock absorbing member, a shock that the shock absorbing member receives from the bumper beam at the time of collision can be relaxed.

BRIEF DESCRIPTION OF THE DRAWINGS

FIGS. 5A and 5B a show shock the absorbing member which is used in the shock absorbing member attaching structure according to the first embodiment of the invention, FIG. 5A being a plan view and FIG. 5B being a front view.

FIG. 6 is a graph plotting characteristic curves of load capacities of a bumper beam used in the shock absorbing member attaching structure according to the first embodiment of the invention and a conventional bumper beam.

DETAILED DESCRIPTION OF THE PREFERRED EMBODIMENTS

Referring to FIGS. 1 to 7, a shock absorbing member attaching structure according to a first embodiment of the invention will be described below.

Figure 1A:
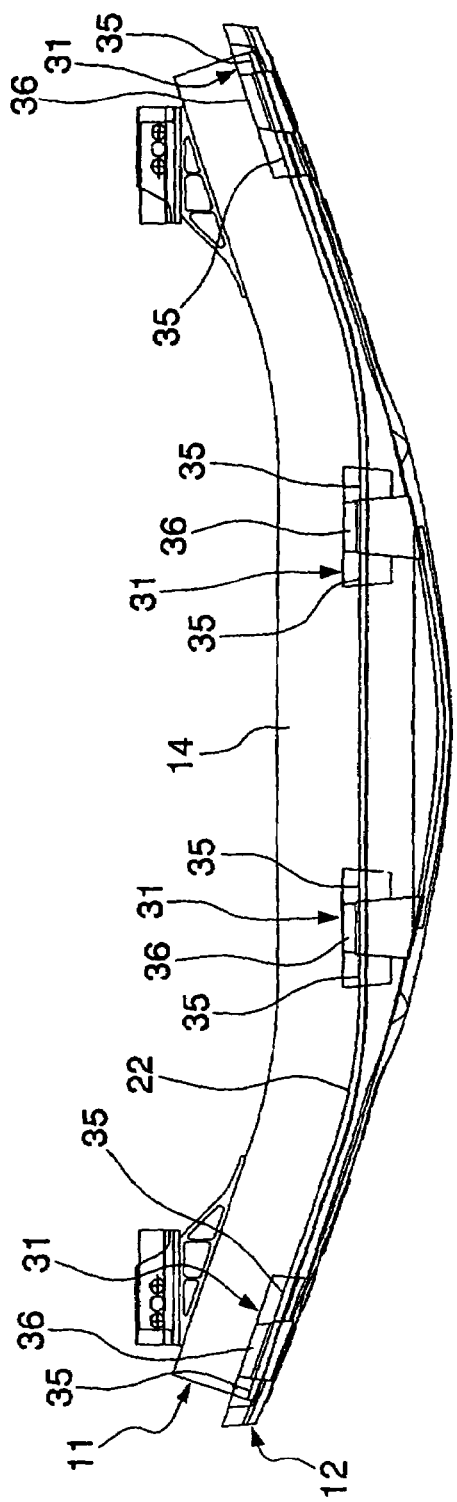
FIGS. 1A and 1B show a shock absorbing member attaching structure according to a first embodiment of the invention, FIG. 1A being a transparent plan view of and FIG. 1B being a transparent front view.
Figure 1B:
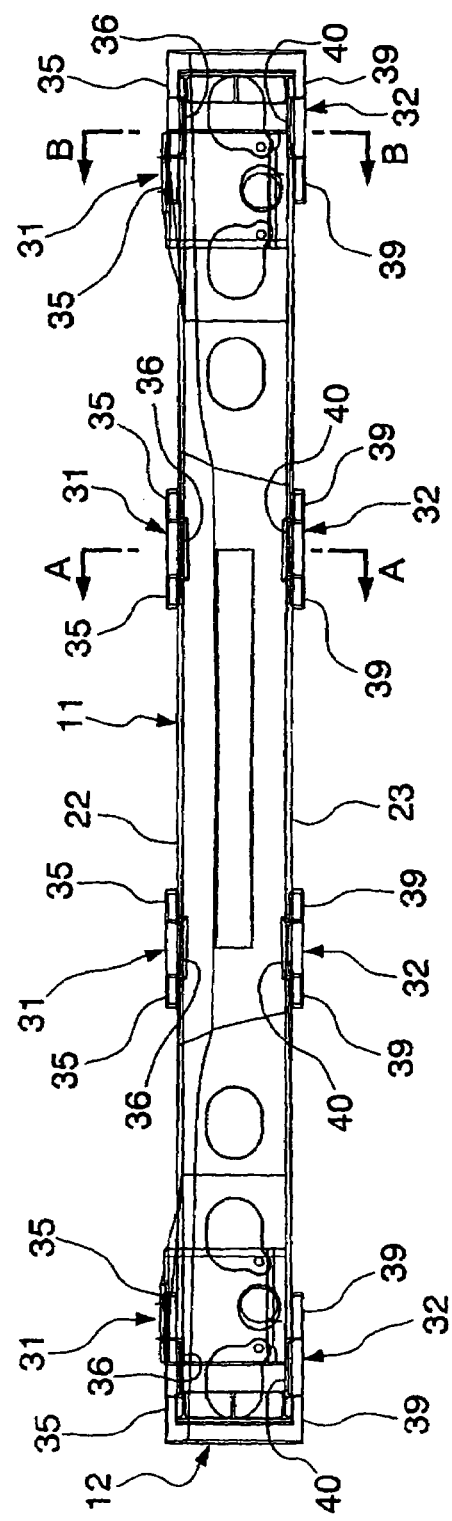

As shown in FIG. 1, the shock absorbing member attaching structure of the first embodiment is such that a shock absorbing member 12 made from a resin is attached to a longitudinally outward side or front side of a bumper beam 11 which constitutes a bumper at a front-end portion of a vehicle body.

Figure 2:
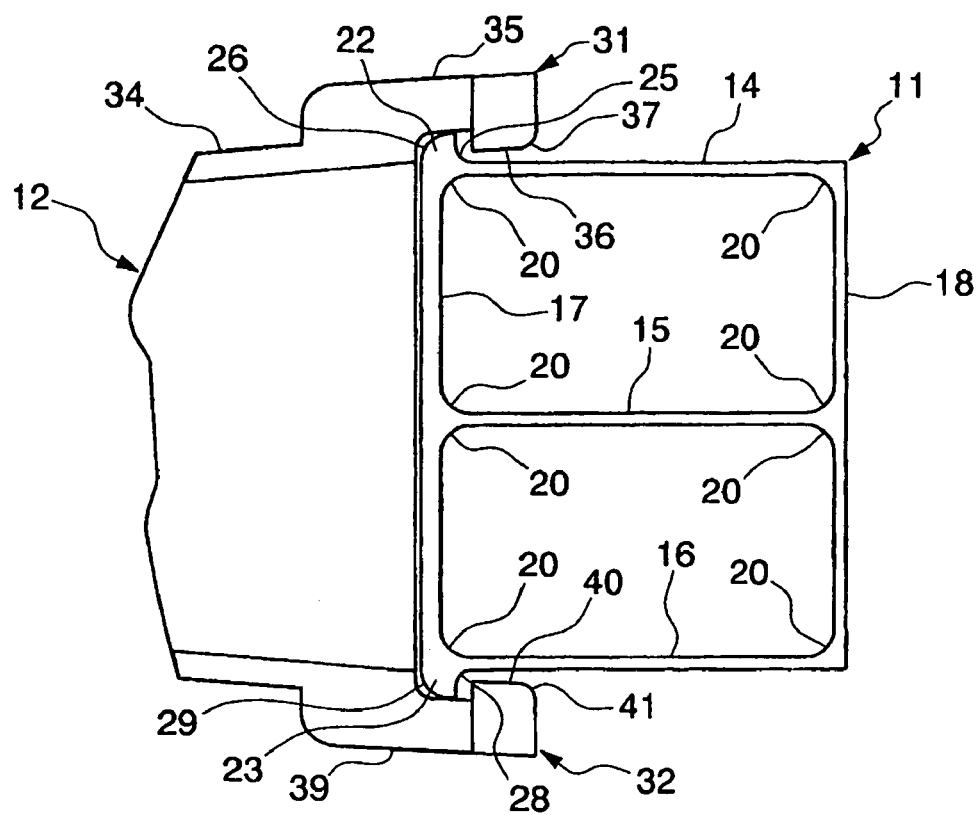
FIG. 2 is a cross-sectional view taken along the line A—A in FIG. 1B, which shows the shock absorbing member attaching structure according to the first embodiment of the invention.
Figure 3:
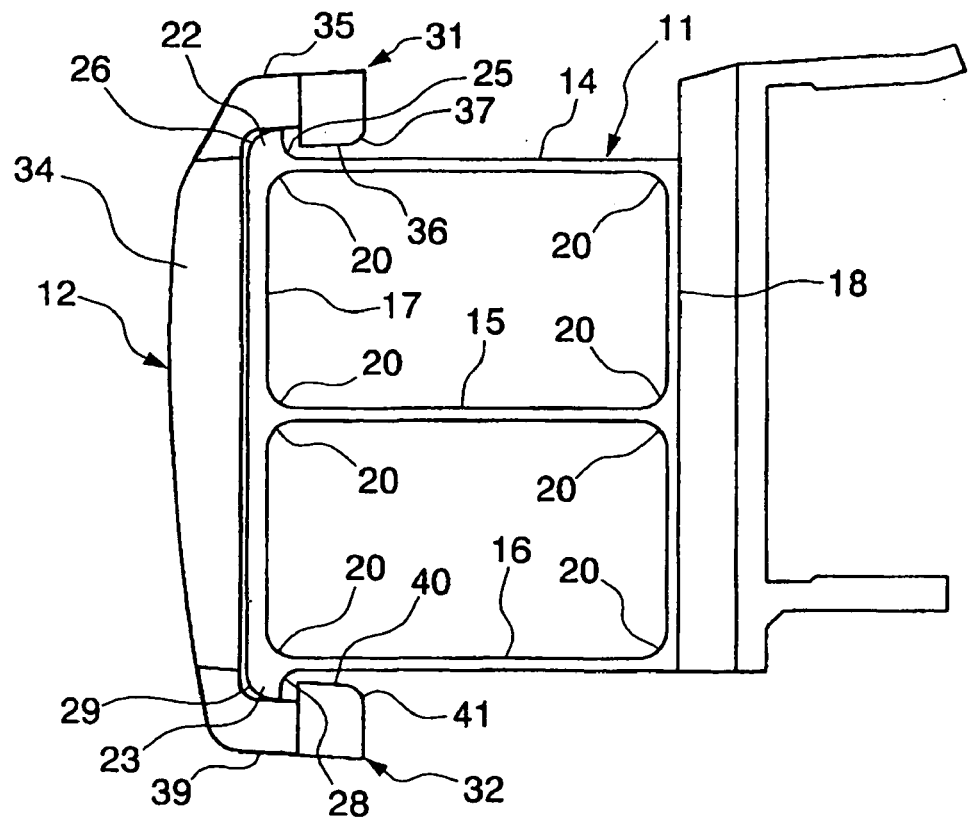
FIG. 3 is a cross-sectional view taken along the line B—B in FIG. 1B, which shows the shock absorbing member attaching structure according to the first embodiment of the invention.

The front bumper beam 11 is such as to include a steel member which is provided so as to extend transversely at the front-end portion of the vehicle body. As shown in FIGS. 2 and 3, the front bumper beam 11 is formed to have a closed cross section having, from the top, a top plate portion 14, a middle plate portion 15 and a bottom plate portion 16 which are disposed horizontally in three stages, a front plate portion 17 which is disposed vertically and is coupled to the top plate portion 14, the middle plate portion 15 and the bottom plate portion 16 on longitudinally front sides thereof, and a rear plate portion 18 which is disposed vertically and is coupled to the top plate portion 14, the middle plate portion 15 and the bottom plate portion 16 on longitudinally rear sides thereof. Note that the bumper beam 11 is, as a whole, formed into a slightly curved configuration in such a manner that a transversely central portion is located at a front-most position, whereas transverse end portions are located at positions which are longitudinally more rearward than the front-most position.

A curved corner portion 20 which forms an arc having its center disposed inwardly is formed on, respectively, an inner side of a boundary portion between the top plate portion 14 and the front plate portion 17 of the bumper beam 11, an inner side of a boundary portion between the top plate portion 14 and the rear plate portion 18, an inner side of a boundary portion between the bottom plate portion 16 and the front plate portion 17, an inner side of a boundary portion between the bottom plate portion 16 and the rear plate portion 18, upper and lower inner sides of a boundary portion between the middle plate portion 15 and the front plate portion 17 and upper and lower inner sides of a boundary portion between the middle plate portion 15 and the rear plate portion 18.

Then, in the first embodiment, a protruding portion 22 which extends transversely along the full length of the bumper beam 11 and protrudes upwardly and a protruding portion 23 which extends transversely along the full length of the bumper beam 11 and protrudes downwardly are formed on a longitudinally outward side or longitudinally front side of the bumper beam 11.

The protruding portion 22 which protrudes upwardly is formed so as to protrude upwardly from the boundary portion between the top plate portion 14 and the front plate portion 17 along the front plate portion 17, and a curved corner portion 25 which forms an arc having its center above the top plate 14 and longitudinally rearward of the protruding portion 22 is formed on an upper side of a boundary portion between the protruding portion 22 and the top plate portion 14. In addition, a curved chamfered portion 26 is formed at an upper portion on a longitudinally outward side or longitudinally front side of the protruding portion 22, in particular, in a range above the top plate portion 14.

The protruding portion 23 which protrudes downwardly is formed so as to protrude downwardly from the boundary portion between the bottom plate portion 16 and the front plate portion 17 along the front plate portion 17, and a curved corner portion 28 which forms an arc having its center below the bottom plate portion 16 and longitudinally rearward of the protruding portion 23 is formed on a lower side of a boundary portion between the protruding portion 23 and the bottom plate portion 16. In addition, a curved chamfered portion 29 is formed at a lower portion on a longitudinally outward side or longitudinally front side of the protruding portion 23, in particular, in a range below the bottom plate portion 16.

According to the above construction, the protruding portions 22, 23 which protrude in the opposite directions are provided on the bumper beam 11, and the curved chamfered portions 26, 29 which are chamfered in an R-like fashion are formed, respectively, on the protruding portions 22, 23 so as to extend from the longitudinally outward side to the side which is separated farther apart from the opposing protruding portion.

Figure 4:
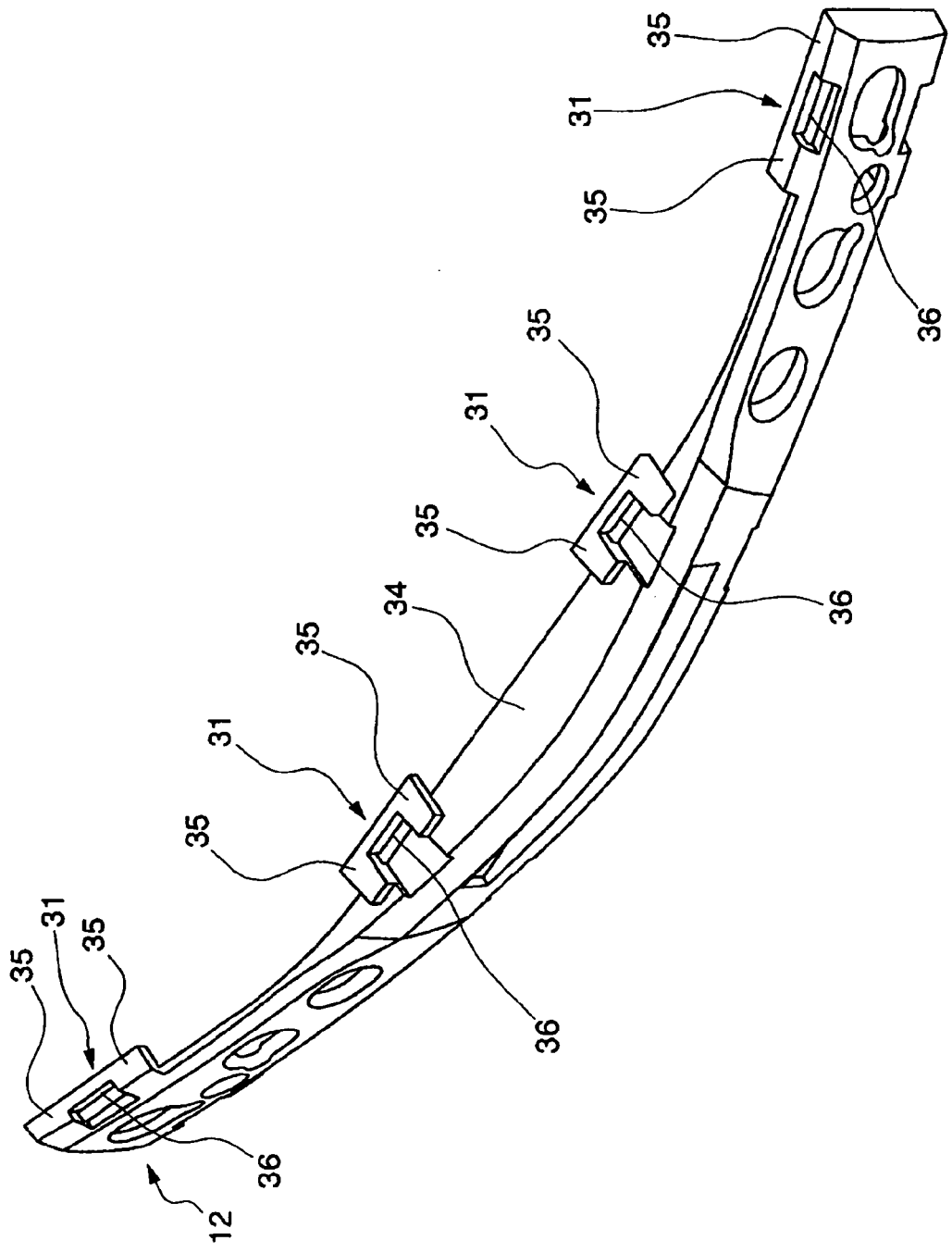
FIG. 4 is a perspective view showing a shock absorbing member which is used in the shock absorbing member attaching structure according to the first embodiment of the invention.

Since the shock absorbing member 12 is an integrally molded product made from an expandable resin such as an expandable polypropylene and is attached to the longitudinally outward side or longitudinally front side of the bumper beam 11, as with the bumper beam 11, the shock absorbing member 12 is, as shown in FIGS. 4 and 5 as well, formed into a slightly curved configuration, as a whole, in such a manner that a transversely central portion is located at a front-most position, whereas transverse end portions are located at positions which are longitudinally rearward of the front-most position.

Then, in the first embodiment, upper and lower attaching portions 31, 32 are formed on a longitudinally inward side or longitudinally rear side of the shock absorbing member 12 at positions which are transversely aligned with each other, and a pair of attaching portions 31, 32 like these is formed on a plurality of locations or, to be specific, four locations which are caused to deviate in the transverse direction of the vehicle body. All the attaching portions 31, 32 are molded integrally with the shock absorbing member 12 when the latter is molded. Each pair of attaching portions 31, 32 is adapted to be brought into engagement with the protruding portions 22, 23 on the bumper beam 11, respectively, without any exception.

As shown in FIGS. 2 to 5, the upper attaching portion 31 has a pair of transversely spaced-apart extending portions 35 which is elevated by one stage from an upper surface of a main body portion 34 of the shock absorbing member 12 and which extends in the longitudinally inward or longitudinally rearward of the main body portion 34 and a locking portion 36 which connects distal ends of the extending portions 35 together at a position spaced apart longitudinally inwardly of the main body portion 34 and protrudes downwardly below the extending portions 35. According to this construction, when viewed from the side of the vehicle body, the attaching portion 31 is formed into an under cut configuration in which the locking portion 36 disposed at the distal ends of the extending portions 35 on the main body portion 34 side protrudes downwardly relative to the extending portions 35. Here, a curved chamfered portion 37 which is chamfered in a so-called R-like fashion is formed on the locking portion 36 in such a manner as to extend from a longitudinally inward side or longitudinally rear side to a bottom side thereof, in particular, a range below the extending portions 35.

The lower attaching portion 32 has a pair of transversely spaced-apart extending portions 39 which is lowered by one stage from a lower surface of the main body portion 34 of the shock absorbing member 12 and which extends in the longitudinally inward or longitudinally rearward of the main body portion 34 and a locking portion 40 which connects distal ends of the extending portions 39 together at a position spaced apart longitudinally inwardly of the main body portion 34 and protrudes upwardly above the extending portions 39. According to this construction, when viewed from the side of the vehicle body, the attaching portion 32 is formed into an under cut configuration in which the locking portion 40 disposed at the distal ends of the extending portions 39 on the main body portion 34 side protrudes upwardly relative to the extending portions 39. Here, a curved chamfered portion 37 which is chamfered in a so-called R-like fashion is formed on the locking portion 40 in such a manner as to extend from a longitudinally inward side or longitudinally rear side to a top side thereof, in particular, a range above the extending portions 39.

Here, a vertical space (a minimum distance) between the locking portions 36, 40 of the upper and lower attaching portions 31, 32, which make a pair, is set shorter by a predetermined distance than a vertical space (a maximum distance) between the upper and lower protruding portions 22, 23, which make a pair, on the bumper beam 11.

Then, when the shock absorbing member 12 that is described heretofore is brought into press contact with the bumper beam 11 from the longitudinally outward side or the longitudinally front side thereof with the extending portions of the attaching portions 31, 32 being at the head while being aligned with the bumper beam 11 vertically and transversely, the locking portions 36 of the upper attaching portions 31 of the shock absorbing member 12 are brought into abutment with the curved chamfered portion 26 of the upper protruding portion 22 of the bumper beam 11 at the curved chamfered portions 37, and the locking portions 40 of the lower attaching portions 32 of the shock absorbing member 12 are brought into abutment with the curved chamfered portion 29 of the lower protruding portion 23 of the bumper beam 11 at the curved chamfered portions 41.

When the shock absorbing member 12 is pressed further against the bumper beam 11 in the above condition, the upper attaching portions 31 is caused to gradually elastically deform in an upward direction with the curved chamfered portions 37 being guided due to their own configurations and the configuration of the curved chamfered portion 26 of the upper protruding portion 22 of the bumper beam 11 to thereby ride on an upper side of the protruding portion 22 at the locking portions 36, and at substantially the same time, the lower attaching portions 32 are also caused to gradually elastically deform in a downward direction with curved chamfered portions 41 being guided due to their own configurations and the configuration of the curved chamfered portion 29 of the lower protruding portion 23 of the bumper beam 11 to thereby ride on a lower side of the protruding portion 23 at the locking portions 40.

Then, when the shock absorbing member 12 continues to be pressed further against the bumper beam 11, the locking portions 36 of the upper attaching portions 31 ride over the upper protruding portion 22 to reach the longitudinally inward side or the longitudinally rear side of the protruding portion 22, and at substantially the same time, the locking portions 40 of the lower attaching portions 32 also ride over the lower protruding portion 23 to reach the longitudinally inward side or longitudinally rear side of the protruding portion 23. As a result, both the upper attaching portions 31 and the lower attaching portions 32 are released from the elastically deformed conditions and are then restored to their original conditions, whereby the locking portions 36 of the upper attaching portions 31 are locked on the longitudinally inward side of the upper protruding portion 22, whereas the locking portions 40 of the lower attaching portions 32 are locked on the longitudinally inward side of the lower protruding portion 23. Thus, the attaching portions 31, 32 are provided on the shock absorbing member 12 which ride over the protruding portions 22, 23, respectively, by virtue of elastic deformation to thereby be locked on the longitudinally inward sides of the protruding portions 22, 23, respectively.

Note that the attachment that is described above is implemented between the protruding portions 22, 23 and each pair of attaching portions 31, 32. In addition, although not illustrated, a bumper face which constitutes a most superficial side of a bumper is attached to the longitudinally outward side or longitudinally front side of the shock absorbing member 12 which is attached to the bumper beam 11 in the manner that is described above.

According to the first embodiment that is described heretofore, the shock absorbing member 12 is managed to be attached to the bumper beam 11 when the respective integrally molded attaching portions 31, 32 are caused to elastically deform so as to ride over the corresponding protruding portions 22, 23 of the bumper beam 11 to thereby locked on the longitudinally inward sides thereof. Consequently, since no clip is required to attach the shock absorbing member 12 to the bumper beam 11, the numbers of components and attaching man-hours can be decreased.

In addition, when the shock absorbing member 12 is brought into press contact with the bumper beam 11, the respective attaching portions 31, 32 are brought into abutment with the curved chamfered portions 26, 29 which are formed, respectively, on the protruding portions 22, 23 of the bumper beam 11 in such a manner as to extend from the longitudinally inward side to the side which is separated farther apart from the opposing protruding portion at the respective curved chamfered portions 37, 41 which are formed, respectively, on the respective attaching portions 31, 32 in such a manner as to extend from the longitudinally inward side to the side which is separated farther apart from the opposing attaching portion. Then, the respective attaching portions 31, 32 are caused to easily elastically deform while being guided by the configurations of these curved chamfered portions 26, 29, 37, 41 and are then allowed to ride on the respective protruding portions 22, 23. Consequently, the attachment of the shock absorbing member 12 to the bumper beam 11 can be facilitated by pressing the shock absorbing member 12 against the bumper beam 11 so as to attach the former to the latter.

In addition, since the curved chamfered portions 26, 29 are formed, respectively, on the protruding portions 22, 23 of the bumper beam 11 in such a manner as to extend from the longitudinally outward side to the side which is separated farther apart from the opposing protruding portion or in such a manner as to face the shock absorbing member 12, the shock absorbing member 12 can relax a shock that is received from the bumper beam 11 at the time of collision. Therefore, a damage can be prevented that would be made at the time of light collision, and the shock absorbing member 12 is allowed to continue to be used thereafter.

Note that a similar advantage to that described above can be obtained even when flat sloping chamfered portions are formed in the place of the curved chamfered portions 26, 29, 37, 41. In addition, a substantially similar advantage can also be obtained even when the curved chamfered portions or sloping chamfered portions are formed only on either of the protruding portions 22, 23 and the locking portions 36, 40.

Additionally, since the transverse extending protruding portions 22, 23 are formed on the bumper beam 11, the protruding portions 22, 23 function as ribs to resist compression in an initial stage of press collapse of the bumper beam 11, whereby an initial load for the bumper beam 11 can be increased, and as shown in a solid line in FIG. 6, the load capacity can be increased higher than a load capacity shown in a broken line in FIG. 6 which would result in the event that the protruding portions 22, 23 are not provided on the bumper beam 11.

Figure 7:
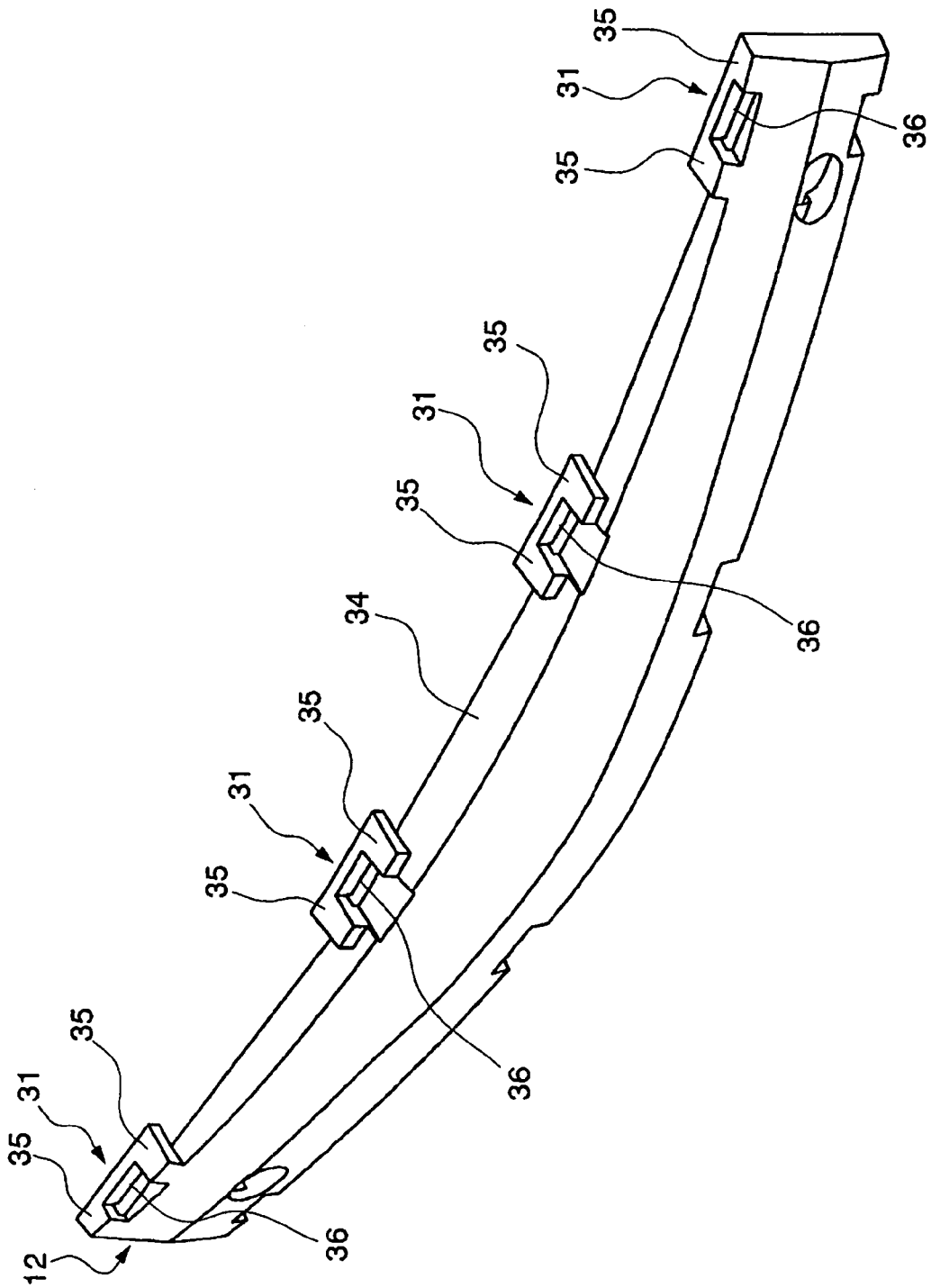
FIG. 7 is a perspective view showing a modified example to the shock absorbing member used in the shock absorbing member attaching structure according to the first embodiment of the invention.

In addition, FIG. 7 shows a modified example to the first embodiment, and the characteristic features are common to both the first embodiment and the modified example and hence a similar advantage can also be provided while the modified example differ from the first embodiment in, for example, that a main body portion 34 of a shock absorbing member 12 is increased in size in the longitudinal direction of the vehicle body.

Next, referring to FIGS. 8 to 12, a shock absorbing member attaching structure according to a second embodiment of the invention will be described below.

Figure 8A:
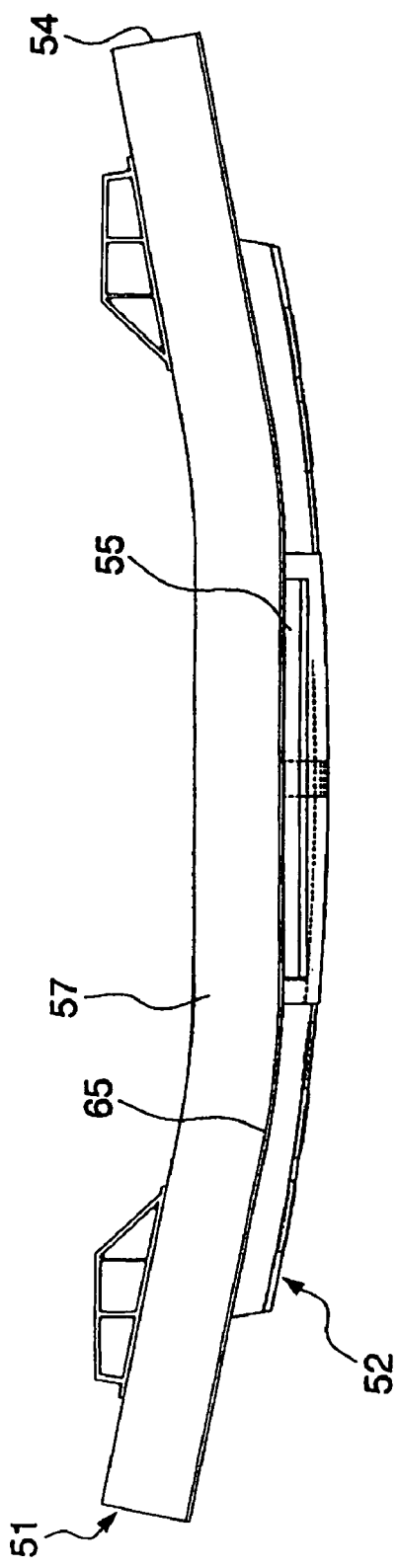
FIGS. 8A and 8B show a shock absorbing member attaching structure according to a second embodiment of the invention, FIG. 8A being a transparent plan view of and FIG. 8B being a transparent front view.
Figure 8B:
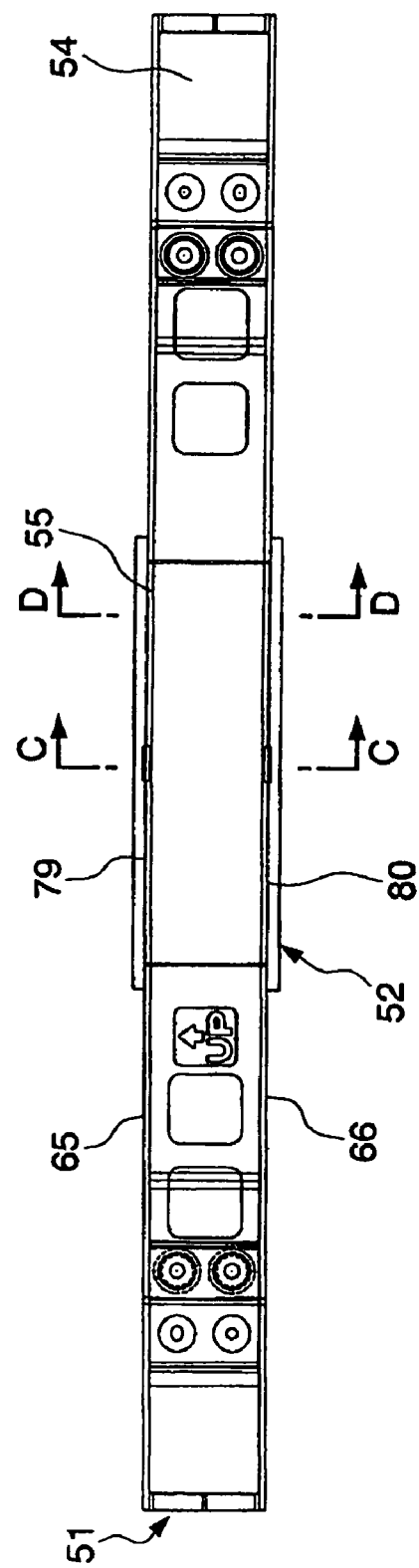

As shown in FIG. 8, the shock absorbing member attaching structure of the second embodiment is such that a shock absorbing member 52 made from a resin is attached to a longitudinally outward side or rear side of a bumper beam 51 which constitutes a bumper at a rear-end portion of the vehicle body.

Figure 9:
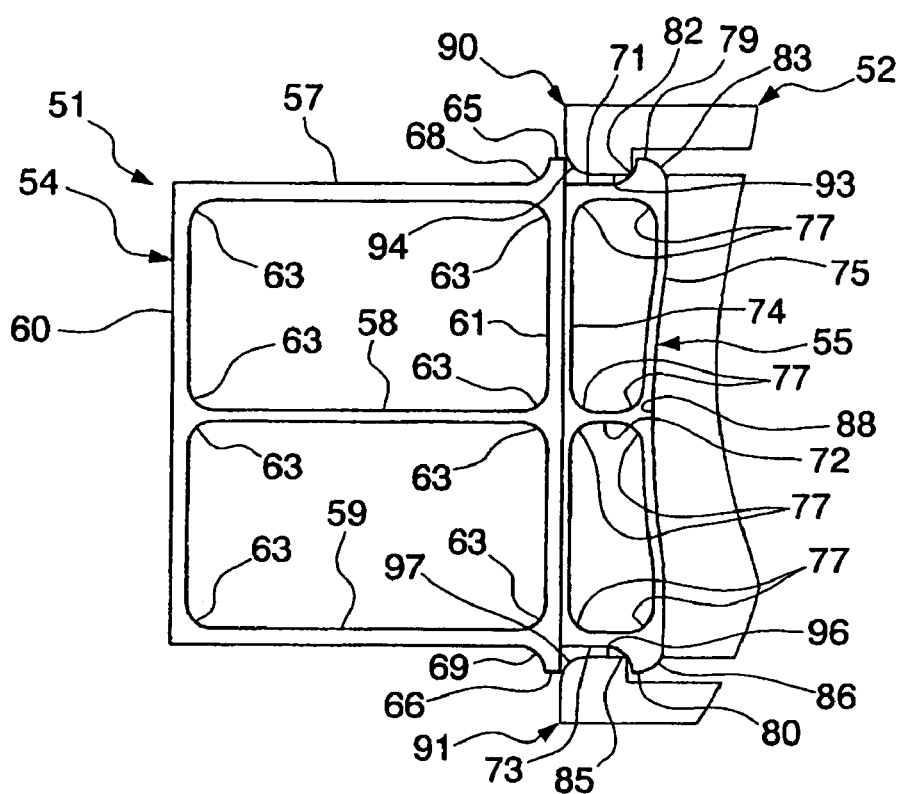
FIG. 9 is a cross-sectional view taken along the line C—C in FIG. 8B, which shows the shock absorbing member attaching structure according to the second embodiment of the invention.
Figure 10:
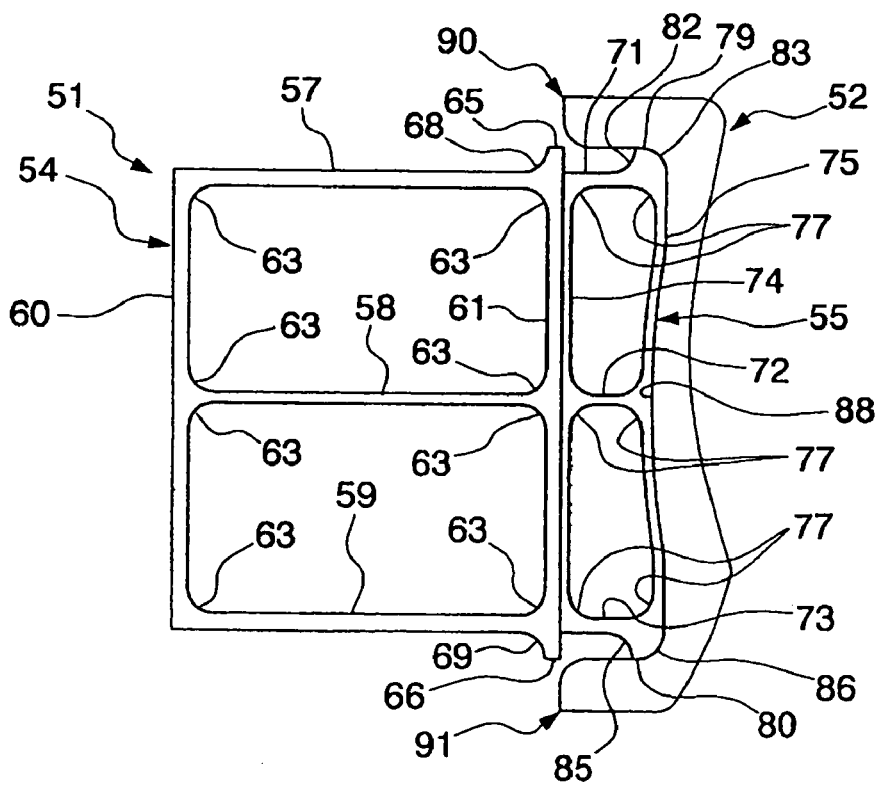
FIG. 10 is a cross-sectional view taken along the line D—D in FIG. 8B, which shows the shock absorbing member attaching structure according to the second embodiment of the invention.
Figure 11A:
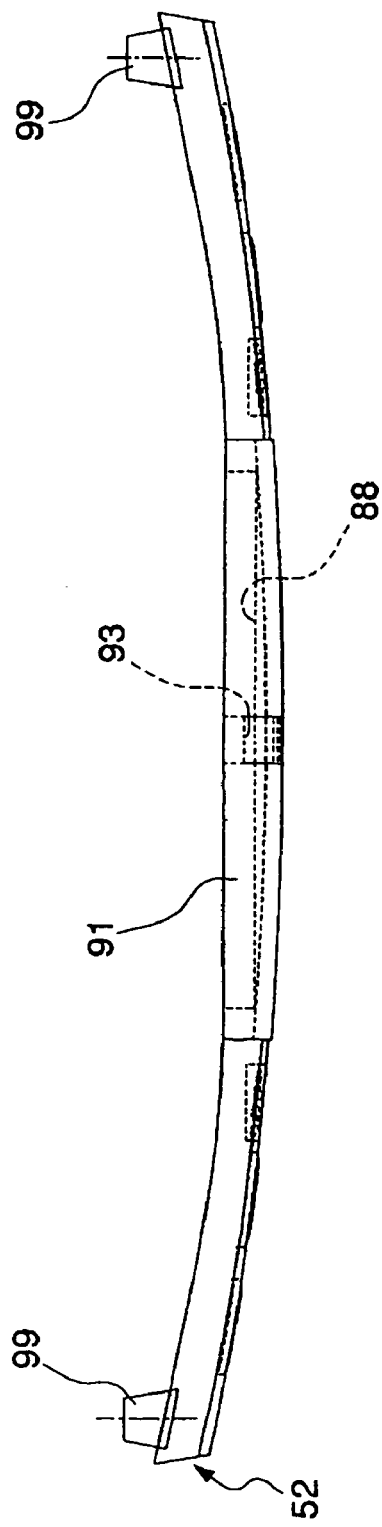
FIGS. 11A and 11B show the absorbing member which is used in the shock absorbing member attaching structure according to the second embodiment of the invention, FIG. 11A being a plan view and FIG. 11B being a front view.
Figure 11B:
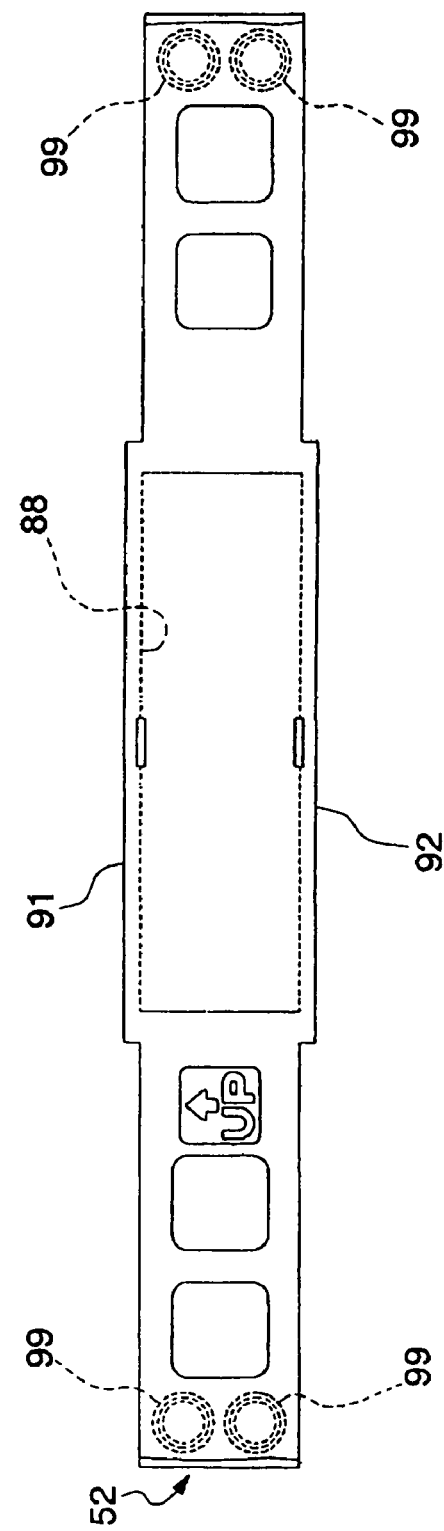
Figure 12:
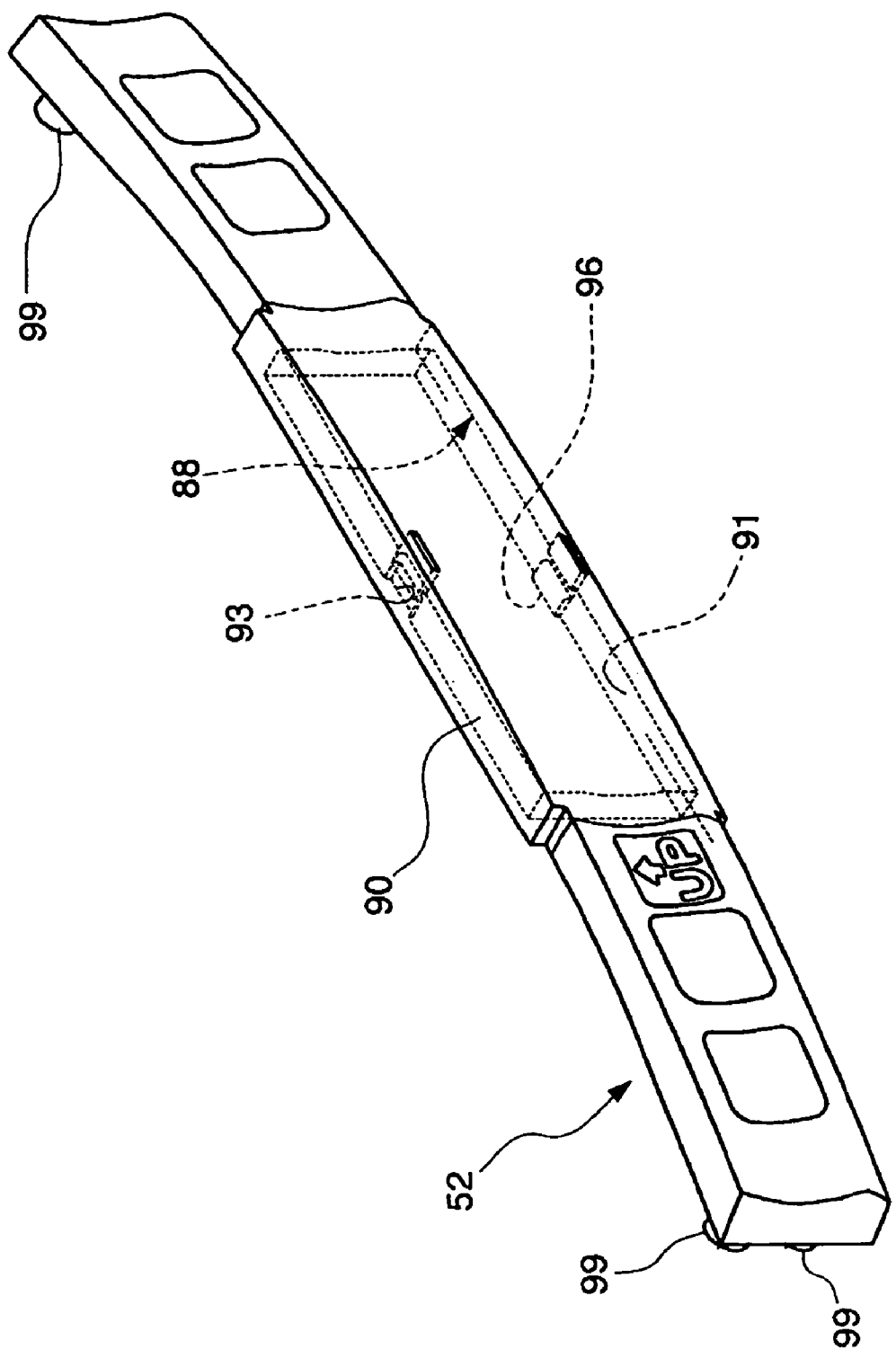
FIG. 12 is a perspective view showing a shock absorbing member which is used in the shock absorbing member attaching structure according to the second embodiment of the invention.

As shown in FIGS. 8 to 10, the rear bumper beam 51 is such as to include a bumper beam main body 54 made of steel which is provided so as to extend transversely at the rear-end portion of the vehicle body and a gusset 55 made of steel which is attached to a longitudinally outward side or longitudinally rear side of the bumper beam main body 54 at a predetermined transversely central range thereof.

The bumper beam main body 54 is formed to have a closed cross section having, from the top, a top plate portion 57, a middle plate portion 58 and a bottom plate portion 59 which are disposed horizontally in tree stages, a front plate portion 60 which is disposed vertically and is coupled to the top plate portion 57, the middle plate portion 58 and the bottom plate portion 59 on longitudinally front sides thereof, and a rear plate portion 61 which is disposed vertically and is coupled to the top plate portion 57, the middle plate portion 58 and the bottom plate portion 59 on longitudinally rear sides thereof. Note that the bumper beam main body 54 is, as a whole, formed into a slightly curved configuration in such a manner that a transversely central portion is located at a rear-most position, whereas transverse end portions are located at positions which are longitudinally more frontward than the rear-most position.

A curved corner portion 63 which forms an arc having its center disposed inwardly is formed on, respectively, an inner side of a boundary portion between the top plate portion 57 and the front plate portion 60 of the bumper beam main body 54, an inner side of a boundary portion between the top plate portion 57 and the rear plate portion 61, an inner side of a boundary portion between the bottom plate portion 59 and the front plate portion 60, an inner side of a boundary portion between the bottom plate portion 59 and the rear plate portion 61, upper and lower inner sides of a boundary portion between the middle plate portion 58 and the front plate portion 60 and upper and lower inner sides of a boundary portion between the middle plate portion 58 and the rear plate portion 61.

A protruding portion 65 which extends transversely along the full length of the bumper beam main body 54 and protrudes upwardly and a protruding portion 66 which extends transversely along the full length of the bumper beam main body 54 and protrudes downwardly are formed on a longitudinally outward side or longitudinally front side of the bumper beam main body 54.

The protruding portion 65 which protrudes upwardly is formed so as to protrude upwardly from the boundary portion between the top plate portion 57 and the rear plate portion 61 along the rear plate portion 61, and a curved corner portion 68 which forms an arc having its center above the top plate 57 and longitudinally frontward of the protruding portion 65 is formed on an upper side of a boundary portion between the protruding portion 65 and the top plate portion 57.

The protruding portion 66 which protrudes downwardly is formed so as to protrude downwardly from the boundary portion between the bottom plate portion 59 and the rear plate portion 61 along the rear plate portion 61, and a curved corner portion 69 which forms an arc having its center below the bottom plate portion 59 and longitudinally frontward of the protruding portion 66 is formed on a lower side of a boundary portion between the protruding portion 66 and the bottom plate portion 59.

The gusset 55 is such as to be attached to the rear plate portion 61 of the bumper beam main body 54 and is formed to have a closed cross section having, from the top, a top plate portion 71, a middle plate portion 72 and a bottom plate portion 73 which are disposed horizontally in three stages, a front plate portion 74 which is disposed vertically and is coupled to the top plate portion 71, the middle plate portion 72 and the bottom plate portion 73 on longitudinally front sides thereof, and a rear plate portion 75 which is disposed vertically and is coupled to the top plate portion 71, the middle plate portion 72 and the bottom plate portion 73 on longitudinally rear sides thereof. In addition, the gusset 55 is formed into a longitudinal linear configuration as a whole and is fixed to the bumper beam main body 54 with the front plate portion 74 being in abutment with the rear plate portion 61 of the bumper beam main body 54. Then, in this fixed condition, the top plate portion 71 is vertically aligned with the top plate portion 57 of the bumper beam main body 54, the middle plate portion 72 is also vertically aligned with the middle plate portion 58 of the bumper beam main body 54, and the bottom plate portion 73 is also vertically aligned with the bottom plate portion 59 of the bumper beam main body 54.

A curved corner portion 77 which forms an arc having its center disposed inwardly is formed on, respectively, an inner side of a boundary portion between the top plate portion 71 and the front plate portion 74 of the gusset 55, an inner side of a boundary portion between the top plate portion 71 and the rear plate portion 75, an inner side of a boundary portion between the bottom plate portion 73 and the front plate portion 74, an inner side of a boundary portion between the bottom plate portion 73 and the rear plate portion 75, upper and lower inner sides of a boundary portion between the middle plate portion 72 and the front plate portion 74 and upper and lower inner sides of a boundary portion between the middle plate portion 72 and the rear plate portion 75.

Then, in the second embodiment, a protruding portion 79 which extends transversely along the full length of the gusset 55 and protrudes upwardly and a protruding portion 80 which extends transversely along the full length of the gusset 55 and protrudes downwardly are formed on a longitudinally outward side or longitudinally rear side of the gusset 55. As a result, a pair of protruding portions 79, 80 is formed at the predetermined transversely central range of the bumper beam 51.

The protruding portion 79 which protrudes upwardly is formed so as to protrude upwardly from the boundary portion between the top plate portion 71 and the rear plate portion 75 along the rear plate portion 75, and a curved corner portion 82 which forms an arc having its center above the top plate 71 and longitudinally frontward of the protruding portion 79 is formed on an upper side of a boundary portion between the protruding portion 79 and the top plate portion 71. In addition, a curved chamfered portion 83 which is chamfered in a so-called R-like fashion is formed a tan upper portion on a longitudinally outward side or longitudinally rear side of the protruding portion 79, in particular, in a range above the top plate portion 71.

The protruding portion 80 which protrudes downwardly is formed so as to protrude downwardly from the boundary portion between the bottom plate portion 73 and the rear plate portion 75 along the rear plate portion 75, and a curved corner portion 85 which forms an arc having its center below the bottom plate portion 73 and longitudinally frontward of the protruding portion 79 is formed on a lower side of a boundary portion between the protruding portion 80 and the bottom plate portion 73. In addition, a curved chamfered portion 86 which is chamfered in a so-called R-like fashion is formed at a lower portion on a longitudinally outward side or longitudinally rear side of the protruding portion 80, in particular, in a range below the bottom plate portion 73.

According to the above construction, the protruding portions 79, 80 which protrude in the opposite directions are provided on the bumper beam 51, and the curved chamfered portions 83, 86 are formed, respectively, on the protruding portions 79, 80 so as to extend from the longitudinally outward side to the side which is separated farther apart from the opposing protruding portion.

Since the shock absorbing member 52 is an integrally molded product made from an expandable resin such as an expandable polypropylene and is attached to the longitudinally outward side or longitudinally rear side of the bumper beam 51, as with the bumper beam 51, the shock absorbing member 52 is formed into a slightly curved configuration, as a whole, in such a manner that a transversely central portion is located at a rear-most position, where as transverse end portions are located at positions which are longitudinally rearward of the front-most position.

Then, in the second embodiment, a fitting recessed portion 88 which is recessed toward a longitudinally outward side or longitudinally rear side of the shock absorbing member 52 is formed in a transversely central portion of the shock absorbing member 52 on a longitudinally inward or longitudinally front side thereof. This fitting recessed portion 88 is made so that the gusset 55 of the bumper beam 51 can be fitted therein and is formed, as shown in FIGS. 9 and 10, between flat attaching portions 90 and 91 which are adapted to hold fully the transverse range of the gusset 55 from the top and bottom thereof when the gusset 55 is fitted therein. The attaching portions 90, 91 are integrally molded when the shock absorbing member 52 is molded.

A locking portion 93 is formed at a transversely center of the attaching portion 90 which protrudes more downwardly than the remaining portion, whereby the attaching portion 90 is formed into an undercut configuration in which the locking portion 93 protrudes more downwardly than the remaining portion as viewed from the side of the vehicle. Here, a curved chamfered portion 94 which is chamfered in a so-called R-like fashion is formed on the locking portion 93 in such a manner as to extend from a longitudinally inward side or longitudinally front side to a bottom side of the locking portion 93.

A locking portion 96 is also formed at a transversely center of the attaching portion 91 which protrudes more downwardly than the remaining portion, whereby the attaching portion 91 is formed into an undercut configuration in which the locking portion 96 protrudes more upwardly than the remaining portion as viewed from the side of the vehicle. Here, a curved chamfered portion 97 which is chamfered in a so-called R-like fashion is formed on the locking portion 96 in such a manner as to extend from a longitudinally inward side or longitudinally front side to an upper side of the locking portion 96.

Here, a vertical space (a minimum distance) between the upper and lower locking portions 93, 96 is set shorter by a predetermined distance than a vertical space (a maximum distance) between the upper plate portion 71 and the lower plate portion 72 of the gusset 55.

In addition, a plurality of or, to be specific, two boss portions 99 which each protrude longitudinally inwardly are formed at each transverse end of the shock absorbing member 52.

Then, when the shock absorbing member 52 that is described heretofore is brought into press contact with the bumper beam 51 from the longitudinally outward side or the longitudinally rear side thereof while being aligned with the bumper beam 51 transversely and vertically in such a manner that the fitting recessed portion 88 is fitted over the gusset 55 of the bumper beam 51 and the plurality of boss portions 99 on the bumper beam main body 54 are fitted into fitting holes, not shown, the locking portion 93 on the attaching portion 90 of the shock absorbing member 52 is brought into abutment with the curved chamfered portion 83 on the upper protruding portion 79 of the gusset 55 of the bumper beam 51 at the curved chamfered portion 94 thereof, and substantially at the same time, the locking portion 96 on the attaching portion 91 is brought into abutment with the curved chamfered portion 86 on the lower protruding portion 80 of the gusset 55 at the curved chamfered portion 97 thereof.

When the shock absorbing member 52 is pressed further against the bumper beam 51 in the above condition, the upper attaching portion 91 is caused to gradually elastically deform in an upward direction with the curved chamfered portion 94 being guided due to its own configuration and the configuration of the curved chamfered portion 83 on the upper protruding portion 79 of the bumper beam 51 to thereby ride on an upper side of the protruding portion 79 at the locking portion 93, and substantially at the same time, the lower attaching portion 91 is also caused to gradually elastically deform in a downward direction with the curved chamfered portion 97 being guided due to its own configuration and the configuration of the curved chamfered portion 86 on the lower protruding portion 91 to thereby ride on a lower side of the protruding portion 80 at the locking portions 96.

Then, when the shock absorbing member 52 continues to be pressed further against the bumper beam 51, the locking portion 93 of the upper attaching portion 90 rides on an upper side of the protruding portion 79 to reach the longitudinally inward side or the longitudinally front side of the protruding portion 79, and substantially at the same time, the locking portion 96 on the lower attaching portion 91 also rides on a lower side of the protruding portion 80 to reach the longitudinally inward side or longitudinally front side of the protruding portion 80. As a result, both the attaching portion 90 and the attaching portion 91 are released from the elastically deformed conditions and are then restored to their original conditions, whereby the locking portion 93 of the upper attaching portion 90 is locked on the longitudinally inward side of the upper protruding portion 79, whereas the locking portion 96 of the lower attaching portion 91 is locked on the longitudinally inward side of the lower protruding portion 80. Thus, the attaching portions 90, 91 are provided on the shock absorbing member 52 which ride over the protruding portions 79, 80, respectively, by virtue of elastic deformation to thereby be locked on the longitudinally inward sides of the protruding portions 79, 80, respectively.

Note that, although not illustrated, a bumper face which constitutes a most superficial side of a bumper is attached to the longitudinally outward side or longitudinally rear side of the shock absorbing member 52 which is attached to the bumper beam 51 in the manner that is described above.

Thus, according to the second embodiment that is described heretofore, a similar advantage to that provided by the first embodiment can be provided. In addition, a similar modification to that made to the first embodiment can be made to the second embodiment.

As is described in detail heretofore, according to the first aspect of the invention, the shock absorbing member is attached to the bumper beam when the respective attaching portions thereof ride over the mating protruding portions on the bumper beam by virtue of elastic deformation thereof to be locked onto the protruding portions on the longitudinally inward side thereof. Consequently, since no clip is required to attach the shock absorbing member to the bumper beam, the numbers of components and attaching man-hours can be decreased.

According to the second aspect of the invention, when the shock absorbing member is pressed against the bumper beam, the respective attaching portions are brought into abutment with the respective protruding portions on the bumper beam at the sloping chamfered portions or curved chamfered portions formed on the respective attaching portions in such a manner as to extend from the longitudinally inward side to the side which is closer to the opposing attaching portion, and are then guided to follow the configuration of the sloping chamfered portions or curved chamfered portions so as to elastically deform with ease to thereby ride on the respective protruding portions. Consequently, the attachment of the shock absorbing member to the bumper beam can be facilitated by pressing the shock absorbing member against the bumper beam so as to attach the former to the latter.

According to the third aspect of the invention, when the shock absorbing member is pressed against the bumper beam, the respective attaching portions are brought into abutment with the sloping chamfered portions or curved chamfered portions formed on the respective protruding portions on the bumper beam in such a manner as to extend from the longitudinally outward side to the side which is separated farther apart from the opposing attaching portion, and are then guided to follow the configuration of the sloping chamfered portions or curved chamfered portions so as to elastically deform with ease to thereby ride on the respective protruding portions. Consequently, the attachment of the shock absorbing member to the bumper beam can be facilitated by pressing the shock absorbing member against the bumper beam so as to attach the former to the latter. Moreover, since the sloping chamfered portions or curved chamfered portions are formed in such a manner as to extend from the longitudinally outward side to the side which is separated farther apart from the opposing attaching portion, that is, on the side which faces the shock absorbing member, a shock that the shock absorbing member receives from the bumper beam at the time of collision can be relaxed. Therefore, a damage can be prevented that would be made at the time of light collision, and the shock absorbing member is allowed to continue to be used thereafter.

What is claimed is:

1. A bumper shock absorbing structure for a vehicle body, comprising:
    a bumper beam having a closed cross section including a front plate portion and a rear plate portion and first, second, and third plate portions in three stages perpendicular to the front and rear plate portions, said bumper beam also including protruding portions which protrude in opposite directions, wherein said first, second, and third plate portions and said protruding portions acting as ribs function to strengthen said bumper beam against a shock, each of said protruding portions having a sloping chamfered portion or a curved chamfered portion formed to extend from a front side of said bumper beam;
    a shock absorbing member made from a resin and having attaching portions adapted to ride over the respective protruding portions due to elastic deformation so as to be locked onto a longitudinally inward side of the protruding portions, each of said attaching portions having a sloping chamfered portion or a curved chamfered portion formed to extend from a rear side of said shock absorbing member to a side which is closer to the opposing attaching portion, wherein said attaching portions and said protruding portions function as an efficient attaching structure for said shock absorbing member to said bumper beam.

2. A bumper shock absorbing structure for a vehicle body, comprising:
    a bumper beam including protruding portions which protrude in opposite directions, each of the protruding portions having a sloping chamfered portion or a curved chamfered portion formed to extend from a front side of the bumper beam;
    a shock absorbing member having attaching portions adapted to ride over the respective protruding portions due to elastic deformation so as to be locked onto a rear side of the protruding portions, each of the attaching portions having a sloping chamfered portion or a curved chamfered portion formed to extend from a rear side of the shook absorbing member to a side which is closer to the opposing attaching portion, wherein the attaching portions and the protruding portions function as an efficient attaching structure for the shock absorbing member to the bumper beam.

3. The bumper shock absorbing structure of claim 2, wherein the bumper beam includes a closed cross section defined by a front plate portion and a rear plate portion and first, second, and third plate portions extending between the front and rear plate portions.

4. The bumper shock absorbing structure of claim 2, wherein the bumper beam includes a front plate portion, a rear plate portion, and at least first and second plate portions extending between the front and rear plate portions, the first and second plate portions and the protruding portions acting as ribs that function to strengthen the bumper beam against a shock.

5. The bumper shock absorbing structure of claim 2, wherein the sloping chamfered or curved portion of the protruding portions are further formed to extend to a side of the protruding portion that is separated farther apart from the opposing protruding portion.

* * * * *